United States Patent [19]

Wordin

[11] Patent Number: 5,044,606
[45] Date of Patent: Sep. 3, 1991

[54] VALVE STEM AND PACKING ASSEMBLY

[75] Inventor: John J. Wordin, Bingham County, Id.

[73] Assignee: The United States of America as represented by the United States Department of Energy, Washington, D.C.

[21] Appl. No.: 531,487

[22] Filed: May 31, 1990

[51] Int. Cl.$^5$ .................... F16K 41/04; F16K 25/00; F16K 5/14

[52] U.S. Cl. ................................ 251/214; 251/181; 251/309; 251/314; 277/110; 277/116; 277/123; 277/169

[58] Field of Search ............... 251/181, 214, 309, 312, 251/314; 277/110, 123, 64, 106, 115, 116, 169

[56] References Cited

U.S. PATENT DOCUMENTS

| | | | |
|---|---|---|---|
| 128,906 | 7/1872 | Reed | 277/116 |
| 131,799 | 10/1872 | Vreeland et al. | 251/181 |
| 272,819 | 2/1883 | Wilbraham | 277/116 |
| 606,754 | 7/1898 | Armstrong | 277/116 |
| 734,633 | 7/1903 | Titus | 277/110 |
| 1,139,120 | 5/1915 | Hoffman | 277/115 |
| 1,799,335 | 4/1931 | Waddell | 277/116 |
| 1,928,122 | 9/1933 | Bennett | 277/110 |
| 2,537,230 | 1/1951 | Mueller | 277/116 |
| 2,573,832 | 11/1951 | Callahan | 277/105 |
| 3,033,581 | 5/1962 | Sims | 277/169 |
| 3,038,694 | 6/1962 | Dunbeck et al. | 251/309 |
| 3,386,699 | 6/1968 | Petter et al. | 277/169 |
| 3,807,692 | 4/1974 | Usab et al. | 251/309 |
| 3,815,870 | 6/1974 | Milleville et al. | 251/181 |
| 4,809,993 | 3/1989 | Henshaw | 277/110 |
| 4,878,652 | 11/1989 | Wordin | 251/181 |

OTHER PUBLICATIONS

"Advanced Mathematics for Engineers"; Reddick and F. H. Miller, John Wiley and Son, 1955, pp. 102 and 103.

Primary Examiner—George L. Walton
Attorney, Agent, or Firm—Helen S. Cordell; John M. Albrecht; William R. Moser

[57] ABSTRACT

A valve stem and packing assembly is provided in which a rotatable valve stem includes a first tractrix surface for sliding contact with a stem packing and also includes a second tractrix surface for sliding contact with a bonnet. Force is applied by means of a spring, gland flange, and gland on the stem packing so the stem packing seals to the valve stem and bonnet. This configuration serves to create and maintain a reliable seal between the stem packing and the valve stem.

The bonnet includes a second complementary tractrix surface for contacting the second sliding tractrix surface, the combination serving as a journal bearing for the entire valve stem and packing assembly. The journal bearing so configured is known as a Schiele's pivot. The Schiele's pivot also serves to maintain proper alignment of the valve stem with respect to the bonnet. Vertical wear between the surfaces of the Schiele's pivot is uniform at all points of contact between the second sliding tractrix surface and the second complementary tractrix surface of a bonnet.

The valve stem is connected to a valve plug by means of a slip joint. The valve is opened and closed by rotating the valve stem. The slip joint compensates for wear on the Schiele's pivot and on the valve plug.

A ledge is provided on the valve bonnet for the retaining nut to bear against. The ledge prevents overtightening of the retaining nut and the resulting excessive friction between stem and stem packing.

13 Claims, 2 Drawing Sheets

VALVE STEM AND PACKING ASSEMBLY

CONTRACTUAL ORIGIN OF THE INVENTION

The U.S. Government has right in this invention pursuant to Contract No. DE-AC07-84ID12435 between the U.S. Department of Energy and Westinghouse Electric Corporation.

BACKGROUND OF THE INVENTION

The present invention relates to the field of valves, and more particularly to valve stems and stem packings that prevent leaks around valve stems.

A problem often encountered with valves is leaks around the valve stem due to wear on the stem packing. The conventional shape of a stem packing is a cylinder with a hole through the center to receive the valve stem. A gap develops between the stem packing and the valve stem due to frictional wear. This gap allows leaks to occur. It would be desirable, therefore, to provide a valve which does not readily develop leaks between a valve stem and its stem packing.

Another problem associated with valves occurs when a retaining nut is over-tightened resulting in a stem packing being excessively compressed against the valve stem. When this occurs, the valve stem is difficult to turn because of excessive friction between the valve stem and the stem packing, and the stem packing wears prematurely because of the excessive friction. It would be desirable, therefore, to provide a valve that prevents the retaining nut from being over-tightened.

Accordingly, it is an object of the present invention to provide a valve which does not readily develop leaks between a valve stem and its stem packing.

Another object of the invention is to provide a valve that prevents a threaded retaining nut from being over-tightened.

Additional objects, advantages, and novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention as described herein, an improved valve stem and packing assembly is provided. A rotatable valve stem includes a first sliding tractrix surface for sliding contact with a stem packing. The stem packing includes a first complementary tractrix surface for contacting the first sliding tractrix surface on the valve stem. Vertical wear between the contacting surfaces is uniform at all points of contact between the first sliding tractrix surface and the first complementary tractrix surface. The stem packing also includes a cylindrical surface for contacting a cylindrical wall of a bonnet. Means are provided for urging the stem packing against the valve stem and the bonnet, whereby a seal is created against the stem packing.

More specifically, the urging means may include a threaded retaining nut that screws onto complementary threads of the bonnet. The bonnet includes a stop element that prevents the threaded retaining nut from being screwed on the bonnet past a predetermined distance. A spring is compressed by the threaded retaining nut. The spring is compressed against a top surface of a gland flange, which transmits the force of the spring to the bottom surface of the gland flange. The bottom surface of the gland flange transmits the force of the compressed spring to a top surface of a gland. The gland transmits the force of the compressed spring onto the top surface of the stem packing, whereby the first sliding tractrix surface of the stem packing is urged by the force of the spring against the first complementary tractrix surface of the valve stem.

Preferably, the bottom surface of the gland flange and the top surface of the gland are arcuate in shape, whereby the gland is urged against the valve stem under the force of the spring. Also, preferably, the bottom surface of the gland and the top surface of the stem packing are slanted, whereby the stem packing is urged against the valve stem under the force of the spring.

In accordance with another aspect of the invention, a valve stem and packing assembly is provided in which a rotatable valve stem includes a first sliding tractrix surface for sliding contact with a first complementary tractrix surface of a stem packing and also includes a second sliding tractrix surface for sliding contact with a second complementary tractrix surface of a bonnet. The bonnet includes a second complementary tractrix surface portion for contacting the second sliding tractrix surface, the combination serving as a journal bearing for the entire valve stem and packing assembly. The journal bearing so configured is also known as a Schiele's pivot. The Schiele's pivot also serves to maintain proper alignment of the valve stem with respect to the bonnet. With the invention, vertical wear between the second sliding tractrix surface portion of the valve stem and the second complementary tractrix surface of the bonnet is uniform at all points of contact between the second sliding tractrix portion and the second complementary tractrix surface portion of the bonnet.

In accordance with yet another aspect of the invention, a valve stem is provided which includes a first sliding tractrix surface for sliding contact with a first complementary tractrix surface of a stem packing.

In accordance with yet another aspect of the invention, a valve stem packing is provided which includes a first sliding tractrix surface for sliding contact with a first complementary tractrix surface of a valve stem.

In accordance with yet another aspect of the invention, a plug valve assembly is provided which includes a valve stem and packing assembly of the invention and a valve plug and complementary valve chamber which includes a valve sealing surface with a cross-sectional shape of a tractrix, wherein the valve plug is rotated by the valve stem and packing assembly.

In operation of the valve stem and packing assembly of the invention, the stem packing remains stationary while the valve stem rotates. To ensure that the stem packing remains stationary, the surface finish on the stem is smooth, and the surface finish on the bonnet is not as smooth. This will cause the stem packing to adhere to the bonnet and allow the valve stem to rotate freely next to the stem packing.

Typical materials of construction of the stem packing can be used. Materials such as Teflon and Grafoil are common stem packing materials. Grafoil is a registered trademark of Union Carbide Corporation, U.S. Pat. No. 3,404,061.

Still other objects of the present invention will become readily apparent to those skilled in this art from the following description, wherein there is shown and described a preferred embodiment of this invention. Simply by way of illustration, the invention will be set forth in part in the description that follows and in part will become apparent to those skilled in the art upon examination of the following or may be learned with the practice of the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE INVENTION

Figure 1:
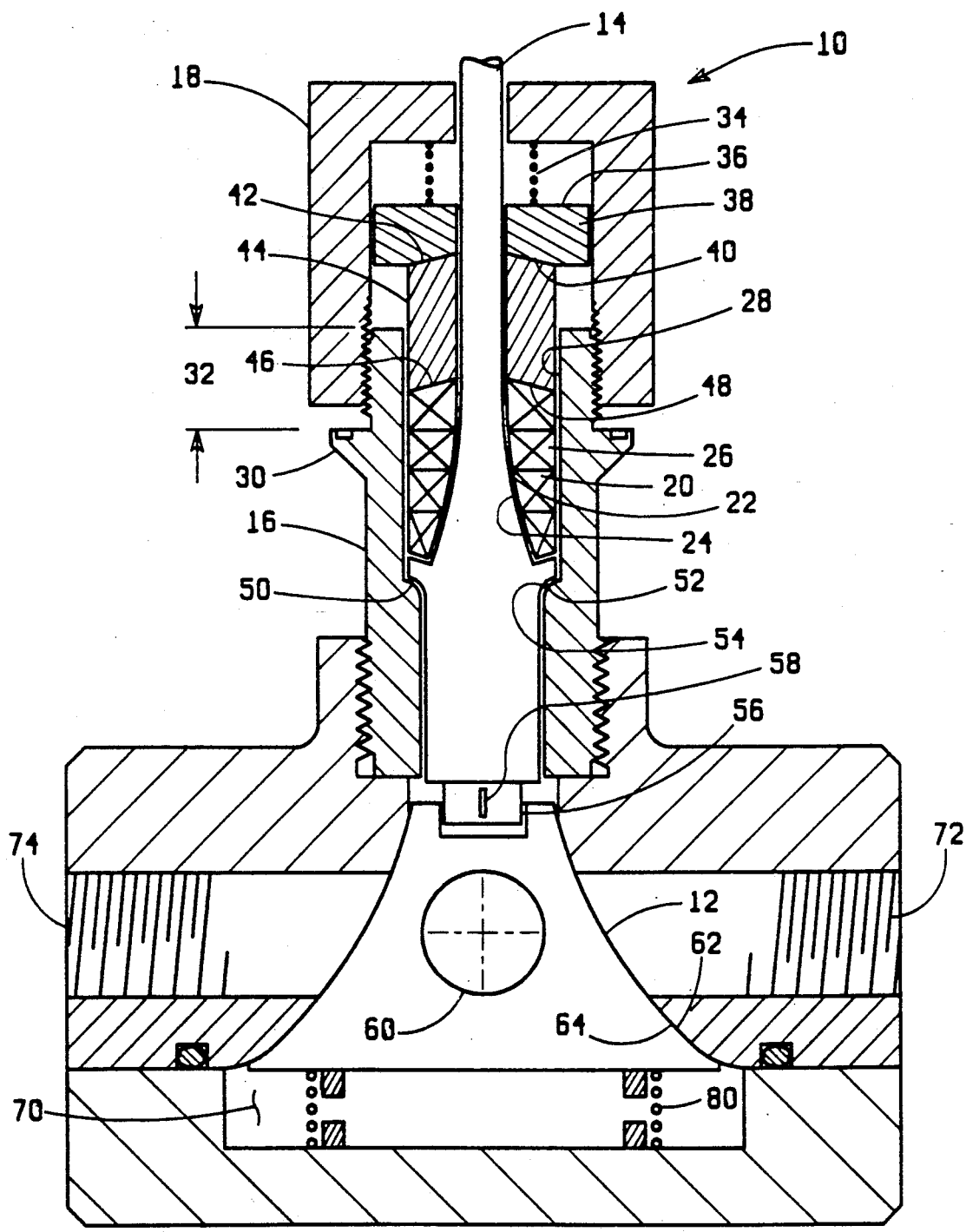
FIG. 1 is a cross-sectional view of a valve stem and packing assembly of the invention used to control a plug valve.

With reference to FIG. 1, there is disclosed a preferred embodiment of valve stem and packing assembly 10 of the present invention used for controlling valve plug 12. In assembly 10, rotatable valve stem 14 is surrounded by valve bonnet 16, and valve stem 14 and bonnet 16 are fastened together with threaded retaining nut 18. Stem packing 20 surrounds valve stem 14 within bonnet 16. Valve stem 14 includes first sliding tractrix surface 22. Stem packing 20 includes first complementary tractrix surface 24. Stem packing 20 also includes cylindrical surface 26 for contacting complementary cylindrical surface 28 of valve bonnet 16.

Means are provided for urging stem packing 20 against valve stem 14 and bonnet 16, whereby a seal is created between valve stem 14 and stem packing 20 and bonnet 16.

More specifically, the urging means includes threaded retaining nut 18 that has threads that screw onto complementary threads of bonnet 16. Bonnet 16 includes a stop element in the form of ledge 30 that prevents threaded retaining nut 18 from being screwed on bonnet 16 past a predetermined distance 32. Stop ledge 30 prevents further tightening on stem packing 20 and places the proper compression and pre-load force on to spring 34 by threaded retaining nut 18.

Spring 34 is compressed against top surface 36 of gland flange 38, which transmits the force of spring 34 to bottom surface 40 of gland flange 38. Bottom surface 40 of gland flange 38 transmits the force of compressed spring 34 to top surface 42 of gland 44. Gland 44 transmits the force of compressed spring 34 onto top surface 46 of stem packing 20, whereby first complementary tractrix surface 24 of stem packing 20 is urged by the force of spring 34 against first sliding tractrix surface 22 of valve stem 14.

Bottom surface 40 of gland flange 38 and top surface 42 of gland 44 are arcuate in shape, whereby gland 44 is urged against valve stem 14 under the force of spring 34. Also, the bottom surface 48 of gland 44 and top surface 46 of stem packing 20 are slanted, whereby stem packing 20 is urged against valve stem 14 under the force of spring 34.

Valve stem 14 also includes a Schiele's pivot 50 to act as a journal bearing between valve stem 14 and bonnet 16. Schiele's pivot 50 is composed of a second sliding tractrix surface 52 for sliding contact with a second complementary tractrix surface 54 on bonnet 16. Second complementary tractrix surface 54 of bonnet 16 contacts second sliding tractrix surface 52, second complementary tractrix surface 54 of bonnet 16 serving as a journal bearing for the entire valve stem and packing assembly 10. With the invention, vertical wear between second sliding tractrix surface portion 52 of valve stem 14 and second complementary tractrix surface portion 54 of bonnet 16 is uniform at all points of contact between second sliding tractrix surface portion 52 and second complementary tractrix surface 54. This feature serves to maintain alignment between valve stem and packing assembly 10 and bonnet 16.

As shown in FIG. 1, valve stem and packing assembly 10 of the invention is used to control valve plug 12. Valve plug 12 is used for control of fluid from inlet passage 72, through valve chamber 70, to outlet passage 74. Spring 80 is used to urge valve plug 12 against valve chamber 70 with sufficient force for the purpose of creating a fluid seal. Valve plug 12 includes third sliding tractrix surface 62. Valve chamber 70 includes third complementary tractrix surface 64. Third sliding tractrix surface 62 of valve plug 12 is for sliding contact with the third complementary tractrix surface 64 of valve chamber 70. Third complementary tractrix surface 64 contacts the third sliding tractrix surface 62 of valve plug 12 serving to seal fluid inside the pipeline. With the invention, vertical wear between third sliding tractrix surface 62 and third complementary tractrix surface 64 is uniform at all points of contact between third sliding tractrix surface 62 and third complementary tractrix surface 64. This feature serves to maintain the seal even after a large number of operations of valve plug 12 and valve stem and packing assembly 10.

More specifically, slip joint 56 connects valve stem 14 to plug stem 58 on one end of valve plug 12. By employing slip joint 56, valve stem 14 is permitted to move and adjust in response to wear on Schiele's pivot 50. By employing slip joint 56, valve plug 12 is permitted to move and adjust in response to wear on valve chamber 70. Slip joint 56 is constructed to permit the torque on valve stem 14 to be transmitted to plug valve 60. It is also constructed such that it can freely slip in an axial direction to accommodate for changes in dimensions due to wear of Schiele's pivot 50, valve plug 12, or both. In addition, slip joint 56 also enables valve stem and packing assembly 10 or valve plug 12 to be removed for maintenance or inspection. Valve stem and packing assembly 10 and valve plug 12, because of slip joint 56, can be disassembled for maintenance independently. For example, valve plug 12 may remain in service when valve stem and packing assembly 10 needs to be replaced. Slip joint 56 could be a spline, a keyway, or other similar known device.

In operation of valve stem and packing assembly 10 of the invention, stem packing 20 remains stationary while valve stem 14 rotates. To ensure that stem packing 20 remains stationary, the surface finish on valve stem 14 is smooth, and the surface finish on bonnet 16 is not as smooth. This will cause stem packing 20 to adhere to bonnet 16 and allow valve stem 14 to rotate freely next to stem packing 20.

Spring 34 is preferably of low spring rate so as to maintain a near constant loading on stem packing 20. As stem packing 20 wears and moves deeper into the valve, the force on the packing only decreases slightly.

Figure 2:
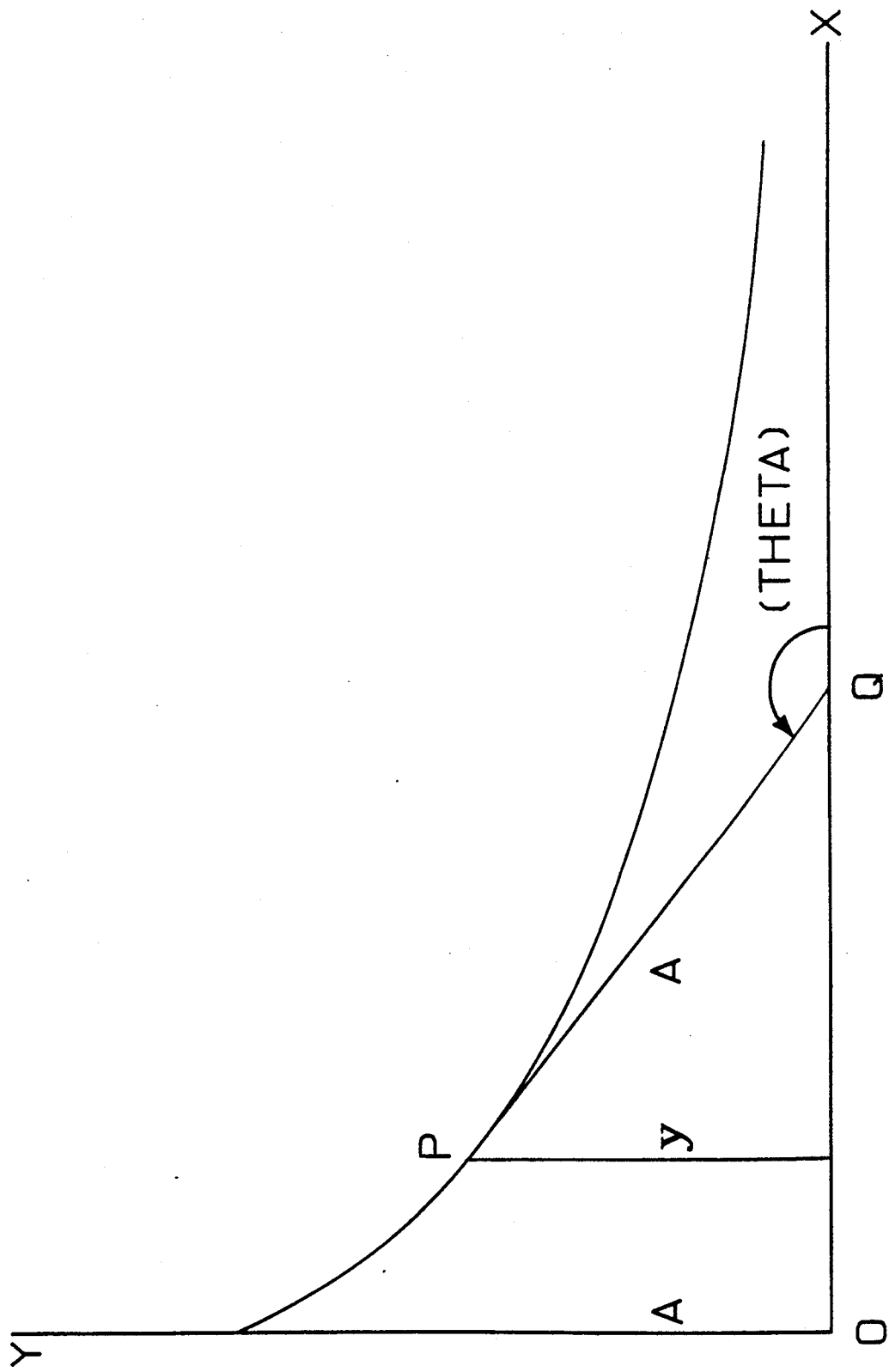
FIG. 2 is a graph of a tractrix curve which forms the basis for the tractrix surfaces of the valve stem, the stem packing, and the Schiele's pivot of the invention, and the plug of the plug valve invention.

With reference to FIG. 2, a tractrix is a curve the length of whose tangent, from point of tangency to the x-axis, is constant. In FIG. 2, heavy particle P is dragged along a rough horizontal plane by string PQ of length A. The path of P, if Q moves along the x-axis and starts at the origin when P is on the y-axis at a distance of A from the origin, is a tractrix.

More specifically, by denoting (THETA) as the obtuse inclination angle of the tangent line PQ to the positive x-axis, by a derivation set forth on pages 102–103 in the book *Advanced Mathematics for Engineers*, by H. W. Reddick and F. H. Miller, the equation for the tractrix is:

$$X = A \cosh^{-1} \frac{A}{y} - (A^2 - y^2)^{\frac{1}{2}}$$

The tractrix surfaces employed in the invention are obtained by rotating a respective tractrix curve through three-dimensional space. (see further U.S. Pat. No. 4,878,652, issued Nov. 7, 1989, to Wordin.)

In summary, numerous benefits have been described which result from employing the principles of the invention. With the invention, a valve is provided which does not readily develop leaks between a valve stem and its stem packing. With the invention, a valve is provided that prevents a threaded retaining nut from being over-tightened.

The foregoing description of the invention has been presented for purposes of illustration and description. It is not intended to be exhaustive or to limit the invention to the precise form disclosed. Obvious modifications or variations are possible in light of the above teachings. For example, although valve stem and packing assembly 10 of the invention is shown in conjunction with valve plug 12 employing tractrix surfaces, valve stem and packing assembly 10 of the invention can be used with virtually any type of valve that is operated by a rotated stem. Furthermore, the valve stem and packing assembly of the invention can be used with hand-operated valves or with valves that are operated by a powered actuator.

The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

The embodiments of this invention in which an exclusive property or privilege is claimed are defined as follows:

1. A valve stem and packing assembly including means for providing uniform wear at all points of contact between contacting parts, said assembly comprising:
   a rotatable valve stem including a first sliding tractrix surface for sliding contact with a stem packing,
   a stem packing including a first complementary tractrix surface for contacting said first sliding tractrix surface, and including a surface for contacting bonnet wall,
   a bonnet including a wall portion for contacting said stem packing surface, and
   means for urging said stem packing against said valve stem and said bonnet, whereby a seal is created and maintained between said stem packing and said valve stem and a seal is created and maintained between said stem packing and said bonnet, wherein said first sliding tractrix surface contacting said first complementary tractrix surface of said stem seal are such that vertical wear between said first sliding tractrix surface and first complementary tractrix surface is uniform at all points of contact between said first sliding tractrix surface and said first complementary tractrix surface, and such that said urging means is effective in creating and maintaining said seal between said valve stem and said stem packing.

2. The assembly described in claim 1 wherein said urging means is comprised of:
   a threaded retaining nut that screws onto complementary threads of said bonnet, said bonnet including a stop element that prevents said threaded retaining nut from being screwed on said bonnet past a predetermined distance,
   a spring compressed by said threaded retaining nut, said spring being compressed against a top surface of a gland flange,
   a gland flange receiving urging by said spring on a top surface and urging a gland on a bottom surface of said gland flange,
   a gland receiving urging on its top surface by said gland flange and a bottom surface of said gland urging a top surface of said stem packing, whereby the tractrix surface of said stem packing is urged against said valve stem.

3. The assembly described in claim 2 wherein said bottom surface of said gland flange and said top surface of said gland are arcuate, whereby said gland is urged against said stem packing.

4. The assembly described in claim 2 wherein said bottom surface of said gland and said top surface of said stem packing are slanted, whereby said stem packing is urged against said valve stem and said bonnet.

5. A plug valve assembly, comprising:
   a valve stem and packing assembly described in claim 1, and
   a valve plug and complementary valve chamber which includes a valve sealing surface with the cross-sectional shape of a tractrix, wherein said valve plug is rotated by said valve stem and packing assembly.

6. The assembly described in claim 5 wherein said valve plug and said valve stem and packing assembly are connected by a slip joint.

7. A valve stem and packing assembly including means for providing uniform wear at all points of contact between contacting parts, said assembly comprising:
   a rotatable valve stem including a first sliding tractrix surface for sliding contact with a stem packing,
   a stem packing including a first complementary tractrix surface for contacting said first sliding tractrix surface, and including a surface for contacting a bonnet wall wherein said first sliding tractrix surface contacting said first complementary tractrix surface of said stem packing are such that vertical wear between said first sliding tractrix surface and said first complementary tractrix surface is uniform at all points of contact between said first sliding tractrix surface and said first complementary tractrix surface, a bonnet including a wall portion for contacting said stem packing surface, means for urging said stem packing against said valve stem and said bonnet to compensate for said vertical wear between said first sliding tractrix surface and said first complementary tractrix surface, whereby a seal is created and maintained against said stem packing and said bonnet, wherein said urging means is comprised of:

a threaded retaining nut that screws onto complementary threads of said bonnet, a spring compressed by said threaded retaining nut, said spring being compressed against a top surface of a gland flange, a gland flange receiving urging by said spring on a top surface and urging a gland on a bottom surface of said gland flange, a gland receiving urging on it stop surface by said gland flange, and a bottom surface of said gland urging a top surface of said stem packing, whereby the tractrix surface of said stem packing is urged against the tractrix surface of said valve stem, wherein said bottom surface of said gland flange and said top surface of said gland are arcuate, whereby said gland is urged against said valve stem, and wherein said bottom surface of said gland and said top surface of said stem packing are slanted, whereby said stem packing is urged against said valve stem.

8. A valve stem and packing assembly comprising:

a rotatable valve stem including a first tractrix surface for sliding contact with a stem packing and including a second tractrix surface for sliding contact with a portion of a bonnet, a stem packing including a first complementary tractrix surface for contacting said first sliding tractrix surface, and including a surface for contacting a bonnet wall, a bonnet including a second complementary tractrix surface portion for contacting said second sliding tractrix surface, and including a wall portion for contacting said stem packing surface, means for urging said stem packing against said valve stem and said bonnet, whereby a seal is created and maintained against said stem packing, wherein said first sliding tractrix surface contacting said first complementary tractrix surface of the stem seal are such that vertical wear between said first sliding tractrix surface and first complementary tractrix surface is uniform at all points of contact between said first sliding tractrix surface and first complementary tractrix surface, and such that said urging means is effective in creating and maintaining said seal between said valve stem and said stem pacing.

9. A valve stem and packing assembly, comprising:

a rotatable valve stem including a first tractrix surface for sliding contact with a stem packing and including a second tractrix surface for sliding contact with a portion of a bonnet, a stem packing including a first complementary tractrix surface for contacting said first sliding tractrix surface, and including a surface for contacting a bonnet wall such that vertical wear between said first sliding tractrix surface and said first complementary tractrix surface is uniform at all points of contact between said first sliding tractrix surface and said first complementary tractrix surface, a bonnet including a second complementary tractrix surface portion for contacting said second sliding tractrix surface, and including a wall portion for contacting said stem packing surface, means for urging said stem packing against said valve stem and said bonnet to compensate for said vertical wear, whereby a seal is created and maintained against said stem packing, wherein said second complementary tractrix surface and the second sliding tractrix surface of the valve stem comprise a Schiele's pivot serving as a journal bearing for said valve stem and said stem packing.

10. The assembly described in claim 9 wherein said Schiele's pivot provides a journal bearing surface such that vertical wear between said second sliding tractrix surface of the valve stem and the second complementary tractrix surface of the bonnet is uniform at all points of contact between said second sliding tractrix surface portion and said second complementary tractrix surface thereby maintaining alignment between the valve stem and the bonnet.

11. A valve stem which includes a first sliding tractrix surface for sliding contact with a first complementary tractrix surface of a stem packing such that, when used in a valve stem and packing assembly, vertical wear between said first sliding tractrix surface of said valve stem and said first complementary tractrix surface of said stem packing is uniform at all points of contact between said first sliding tractrix surface and said first complementary tractrix surface and, means for urging said stem packing against said valve stem to compensate for said vertical wear, whereby a seal is created and maintained against said stem packing.

12. A valve stem packing which includes a first complementary tractrix surface for sliding contact with a first sliding tractrix surface of a valve stem such that, when used in a valve stem and packing assembly, vertical wear between said first complementary tractrix surface of said stem packing and said first sliding tractrix surface of said valve stem is uniform at all points of contact between said first complementary tractrix surface and said first sliding tractrix surface and, means for urging said stem packing against said valve stem to compensate for said vertical wear, whereby, a seal is created and maintained against said stem packing.

13. A valve stem and packing assembly including means for providing uniform wear at all points of contact between contacting parts, said assembly comprising:

a rotatable valve stem including a sliding tractrix surface for contacting a portion of a bonnet, and a bonnet including a complementary tractrix surface portion for contacting said sliding tractrix surface, such that vertical wear between said sliding tractrix surface and said complementary tractrix surface is uniform at all points of contact between said sliding tractrix surface and said complementary tractrix surface, wherein said sliding tractrix surface of said valve stem and said complementary tractrix surface of said bonnet comprise a Schiele's pivot serving as a journal bearing for said valve stem and said bonnet.

* * * * *